United States Patent
Sawada

(10) Patent No.: US 9,102,566 B2
(45) Date of Patent: Aug. 11, 2015

(54) REINFORCED PLATE GLASS AND METHOD FOR MANUFACTURING THE SAME

(71) Applicant: NIPPON ELECTRIC GLASS CO., LTD., Shiga (JP)

(72) Inventor: Masahiro Sawada, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 13/780,235

(22) Filed: Feb. 28, 2013

(65) Prior Publication Data

US 2013/0199241 A1    Aug. 8, 2013

Related U.S. Application Data

(62) Division of application No. 12/528,693, filed as application No. PCT/JP2008/053764 on Mar. 3, 2008.

(30) Foreign Application Priority Data

Mar. 2, 2007    (JP) .................................. 2007-052216

(51) Int. Cl.

| | | |
|---|---|---|
| *C03C 21/00* | (2006.01) | |
| *C03C 3/091* | (2006.01) | |
| *C03C 3/093* | (2006.01) | |
| *C03B 33/00* | (2006.01) | |
| *C03B 33/023* | (2006.01) | |
| *C03B 33/027* | (2006.01) | |

(Continued)

(52) U.S. Cl.

CPC ............. *C03C 21/002* (2013.01); *C03B 33/023* (2013.01); *C03B 33/027* (2013.01); *C03B 33/033* (2013.01); *C03B 33/04* (2013.01); *C03B 33/074* (2013.01); *C03B 33/091* (2013.01); *C03C 3/085* (2013.01); *C03C 3/091* (2013.01); *C03C 3/093* (2013.01); *C03C 19/00* (2013.01); *C03C 23/007* (2013.01); *C03C 23/0025* (2013.01)

(58) Field of Classification Search

None

See application file for complete search history.

(56) References Cited

U.S. PATENT DOCUMENTS

| | | | |
|---|---|---|---|
| 4,018,372 A | * | 4/1977 | Insolio ............................. 225/2 |
| 4,671,814 A | | 6/1987 | Aratani et al. |

(Continued)

FOREIGN PATENT DOCUMENTS

| | | |
|---|---|---|
| JP | 07-223845 | 8/1995 |
| JP | 9-236792 | 9/1998 |

(Continued)

OTHER PUBLICATIONS

Veer, "The strength of glass a nontransparent value", Heron, vol. 52 (2007) No. 1/2, pp. 87-104.*

(Continued)

*Primary Examiner* — Lisa Herring

(74) *Attorney, Agent, or Firm* — Wenderoth, Lind & Ponack, L.L.P.

(57) ABSTRACT

A method of manufacturing a reinforced plate glass by which glass surface strength is sufficiently increased, and a stable quality reinforced plate glass is manufactured at high production efficiency. The reinforced plate glass is formed of an inorganic oxide glass, and is provided with a compression stress layer by chemical reinforcement on plate surfaces opposed to each other in a plate thickness direction. Plate end faces have regions where a compression stress is formed and regions where no compression stress is formed.

5 Claims, 2 Drawing Sheets

(51) Int. Cl.
- *C03B 33/033* (2006.01)
- *C03B 33/04* (2006.01)
- *C03B 33/07* (2006.01)
- *C03B 33/09* (2006.01)
- *C03C 3/085* (2006.01)
- *C03C 19/00* (2006.01)
- *C03C 23/00* (2006.01)

(56) References Cited

U.S. PATENT DOCUMENTS

| | | | |
|---|---|---|---|
| 5,776,844 | A | 7/1998 | Koch et al. |
| 5,846,280 | A | 12/1998 | Speit |
| 5,928,793 | A | 7/1999 | Kimura |
| 5,958,812 | A | 9/1999 | Koch et al. |
| 5,972,460 | A | 10/1999 | Tachiwana |
| 6,222,604 | B1 * | 4/2001 | Suginoya et al. ............ 349/158 |
| 6,333,285 | B1 | 12/2001 | Chopinet et al. |
| 6,810,688 | B1 | 11/2004 | Duisit et al. |
| 7,687,420 | B2 | 3/2010 | Murata |
| 2001/0046026 | A1 * | 11/2001 | Suginoya et al. ............ 349/158 |
| 2003/0220183 | A1 | 11/2003 | Kurachi et al. |
| 2005/0056127 | A1 * | 3/2005 | Yamabuchi et al. ............ 83/13 |
| 2005/0221044 | A1 * | 10/2005 | Gaume et al. ............ 428/43 |
| 2005/0250639 | A1 * | 11/2005 | Siebers et al. ............ 501/68 |
| 2006/0063009 | A1 | 3/2006 | Naitou et al. |
| 2007/0060465 | A1 * | 3/2007 | Varshneya et al. ............ 501/68 |
| 2008/0020919 | A1 | 1/2008 | Murata |
| 2008/0053152 | A1 | 3/2008 | Kurachi et al. |
| 2009/0142568 | A1 * | 6/2009 | Dejneka et al. ............ 428/220 |
| 2009/0197048 | A1 | 8/2009 | Amin et al. |
| 2009/0197088 | A1 | 8/2009 | Murata |
| 2010/0119846 | A1 | 5/2010 | Sawada |
| 2010/0190038 | A1 | 7/2010 | Osakabe et al. |
| 2011/0318571 | A1 | 12/2011 | Murata |
| 2011/0318572 | A1 | 12/2011 | Murata |
| 2012/0135153 | A1 | 5/2012 | Osakabe et al. |
| 2012/0141760 | A1 | 6/2012 | Murata |
| 2012/0141801 | A1 | 6/2012 | Murata |

FOREIGN PATENT DOCUMENTS

| | | |
|---|---|---|
| JP | 11-060294 | 3/1999 |
| JP | 11-139840 | 5/1999 |
| JP | 11-217232 | 8/1999 |
| JP | 11-232627 | 8/1999 |
| JP | 2000-519603 | 12/2000 |
| JP | 2002-167230 | 6/2002 |
| JP | 2002/174810 | 6/2002 |
| JP | 2003-514758 | 4/2003 |
| JP | 2004/043295 | 2/2004 |
| JP | 2004-083378 | 3/2004 |
| JP | 2004083378 A * | 3/2004 |
| JP | 2004-107130 | 4/2004 |
| JP | 2004-131314 | 4/2004 |
| JP | 2004-189562 | 7/2004 |
| JP | 2004-216568 | 8/2004 |
| JP | 2004-352535 | 12/2004 |
| JP | 2004-359504 | 12/2004 |
| JP | 2005-314198 | 11/2005 |
| JP | 2006-021947 | 1/2006 |
| JP | 2006-509701 | 3/2006 |
| JP | 2006-137169 | 6/2006 |
| JP | 2006-282492 | 10/2006 |
| JP | 2009-057271 | 3/2009 |
| JP | 2009-099239 | 5/2009 |
| WO | 96/11887 | 4/1996 |

OTHER PUBLICATIONS

Ono et al.,"Effective of Scribing Wheel Dimensions on the Cutting of AMLCD Glass Substrates", Corning Technical Information Paper, Nov. 2004.*

Machine Translation of JP2004-083378 performed on JPO website Jul. 15, 2014.*

JP2004-083378 English Translation Performed by McElroy Translation Company, Jul. 2014.*

Taiwanese Office Action issued Jun. 18, 2013 in corresponding Taiwanese Patent Application No. 097107316, partially in English.

International Search Report dated Apr. 1, 2008 for International Application No. PCT/JP2008/053764.

International Preliminary Report on Patentability and Written Opinion of the International Searching Authority mailed Sep. 17, 2009 for International Application No. PCT/JP2008/053764.

Japanese Office Action issued Sep. 12, 2011 in corresponding Japanese Patent Application No. 2008-051607 w/partial English translation.

* cited by examiner

TENSILE STRESS ← STRESS VALUE → COMPRESSION STRESS
VALUE IS LARGE      IS ZERO            VALUE IS LARGE

REINFORCED PLATE GLASS AND METHOD FOR MANUFACTURING THE SAME

CROSS-REFERENCE TO RELATED APPLICATION

This application is a divisional of U.S. application Ser. No. 12/528,693, filed Aug. 26, 2009, which is a national stage application of PCT/JP2008/053764, filed Mar. 3, 2008, the entireties of which are incorporated herein by reference.

BACKGROUND OF THE INVENTION

I. Technical Field

The present invention relates to plate glass used as a substrate material or a cover glass member to be mounted on an image display portion or an image input portion of various kinds of portable information terminals typified by a mobile phone and a PDA and an electronic appliance typified by a liquid crystal display, and a method of manufacturing the plate glass.

II. Description of the Related Art

In recent years, as recognized in the progress of a digital technology involving all the industrial fields and the like, the information industry has been remarkably developed, and the prosperity thereof is presenting animated appearance in the same way as in the textile industry, steel industry, shipbuilding industry, or the like. Along with this, the technical innovation regarding various kinds of information-related terminals is expanding continuously, as in the increase in sales of mobile appliances such as a mobile phone, a digital camera, and a PDA and a large-type image display apparatus such as a liquid crystal television. A transparent substrate for displaying information such as images and characters or inputting information with a touch panel display is mounted on such information-related terminals, and the substrate adopts glass as a material so as to realize high environment performance and ensure high reliability.

Various environment performances required for glass used for the application shouldering the prosperity of the information industry include various physicochemical performances such as mechanical strength in conformity with the environment in which glass is used, chemical resistance such as weather resistance, and appropriate optical constants such as a transmittance and a refractive index. Therefore, designing a glass material determines an ultimate composition for solving all those problems. A secondary treatment has been conducted with respect to glass so as to solve the higher problems, which cannot be solved only by designing a glass material. Examples of the secondary treatment include physical reinforcement such as the adjustment of a refractive index and a density, a slow cooling operation (which is also called annealing) for maintaining strength, air-cooling reinforcement for reinforcing a glass surface, and chemical reinforcement such as ion exchange.

Of the secondary treatments, the chemical reinforcement of a glass surface has been utilized for a glass product used for various applications requiring reinforcement. Glass products to be chemically reinforced cover a fairly broad spectrum, which includes small things such as a cover glass for a watch such as a wristwatch to large things such as a window plate glass. Further, a large number of inventions have been carried out, which overcome weak points caused when a chemical reinforcement method is conducted. For example, regarding a problem in that the chemical reinforcement method generally decreases the chemical durability of a glass surface, JP 07-223845 A discloses a method of soaking a float plate glass in a potassium nitrate molten salt and further soaking the glass in a lithium aqueous solution so as to produce a chemically reinforced glass excellent in chemical durability. Further, regarding a problem in that a plate glass used for the application such as a touch panel is warped by chemical reinforcement, JP 2004-189562 A discloses an invention which solves the problem by changing the support position of the plate glass while being soaked in a vertical direction for chemical reinforcement with the ratio between the length of a long side and the length of a short side of the plate glass. Further, regarding a problem in that, for chemically reinforcing the entire plate glass, the management of a heat treatment step should be conducted strictly, particularly for treating a large-size plate glass such as a display, which makes it difficult to shorten the time for the step, JP 2006-282492 A discloses an invention solving the problem by spraying an atomized reinforcing agent or a powdery reinforcing agent to a cut portion of a glass plate and irradiating the cut portion with light for heating. Further, JP 2003-514758 A discloses an invention in which a partial reinforcement treatment of a glass plate used for a large display such as a plasma display can be achieved by laminating a paste containing a potassium salt and a high-melting point compound on a glass surface.

SUMMARY OF THE INVENTION

However, only with the inventions which have been carried out so far, it is difficult to realize a chemically reinforced plate glass which has a high function and an excellent surface property, can realize a high production efficiency, is used for the applications such as various kinds of portable information terminals. In the case of applying a chemical reinforcement method such as ion exchange reinforcement, generally, a plate glass is processed to a product shape size and thereafter is subjected to a predetermined chemical treatment. However, according to such a method, the plate glasses with a product size must be supported one by one without the decrease in quality during the reinforcement treatment. Therefore, there arises a problem in that a support method and the like must be devised variously as disclosed in JP 2004-189562 A, or in that even a site that is not required to have high strength as a plate glass product is reinforced because the entire glass is treated in an ordinary reinforcement treatment. Further, conducting a partial reinforcement treatment of a plate glass by a spraying treatment or a paste treatment as in JP 2006-282492 A or JP 2003-514758 A, instead of the entire reinforcement of a glass plate, is excellent in that only a desired portion or site can be reinforced. However, various precise and minute cares must be taken in terms of the treatment facility, management technique, and the like, and hence, there arises a problem that the production of a reinforced plate glass requires much labor.

Further, although the surface of a glass article subjected to chemical reinforcement is supplied with a compression stress, a tensile stress is applied to a glass bulk inside thereof. Therefore, it is difficult to appropriately subject the glass article to the physical processing such as cutting and cleaving which passes through or separates the glass article, after the chemical reinforcement. If an attempt is made on the glass article so as to conduct such processing forcefully, due to the tensile stress inside the glass article, the glass article may be broken. Alternatively, the glass article is not cut or cleaved at a desired position and only a finished article with a low precision is obtained, resulting in the problem with the production of a large number of defective products. Further, there is a region where a large tensile force is applied on the cut surface of the glass article produced at a low efficiency percentage, and hence, an alkali metal component such as sodium in glass is likely to be deposited on the glass surface with time, which causes a problem in the weather resistance of the glass.

Further, in the case of subjecting a plate glass to the reinforcement, a plate glass is previously processed to a final product size by utilizing a scribe break method using diamond or an ultrahard alloy wheel chip, a dicer cut method using a diamond wheel, a laser cut method using a laser, or the like. Then, it is necessary to remove fine cracks and scratches present on the glass surface by grinding for removing minute cracks generated on an end face of the plate glass, polishing, and etching of the glass surface using various agents such as hydrofluoric acids. However, such steps increase labor for the production, and hence, there remains a problem in that a reinforced plate glass cannot be produced at high efficiency.

The present invention solves the above-mentioned various problems, and an object of the present invention is to provide a method of manufacturing an economically excellent reinforced plate glass that is capable of reinforcing the strength of a glass surface sufficiently and producing a reinforced plate glass of stable quality at high production efficiency, and a reinforced plate glass having a high size quality and stable surface strength, obtained by the manufacturing method.

A reinforced plate glass of the present invention is characterized by being made of an inorganic oxide glass, and comprising a compression stress layer formed by chemical reinforcement on each of plate surfaces opposed to each other in a plate thickness direction, and a region where a compression stress is formed and a region where a compression stress is not formed on a plate end face.

In the present invention, a plate glass whose composition can be represented by an inorganic oxide conversion is supplied with energy for increasing a density distribution of particular ion species regarding the surface of the plate and a bulk in the vicinity of the surface, whereby the atomic density of the plate surface and the bulk in the vicinity of the surface is enhanced, and as a result, a compression stress layer parallel to the plate surface is formed. Further, the plate end face is provided with a region where a compression stress is formed and a region where a compression stress is not formed. Herein, the region where a compression stress is not formed is more specifically a region with a compression stress of 0 or a region where a tensile stress acts.

On the plate end face, the region where a compression stress is formed is connected to the plate surface, and the region where a compression stress is not formed is connected to the region where a compression stress is formed.

As a method for the chemical reinforcement of a plate glass, for example, a low-temperature type ion exchange method, a high-temperature type ion exchange method, a surface crystallization method, or a dealkalization method may be adopted appropriately, if required, and a plurality of methods may be used together. In terms of the economical viewpoint, the low-temperature type ion exchange method and the dealkalization method are preferred, and the low-temperature type ion exchange method is more preferably adopted.

The plate end face is preferably a surface formed by physical processing. Herein, the physical processing refers to the processing of applying a mechanical stress to the surface of glass, such as cutting, trimming, and grinding. For example, when a plate glass on the surface of which a compression stress layer is formed by chemical reinforcement is divided by cutting, the plate end face formed of the cut surface has a region where a compression stress is formed and a region where a compression stress is not formed. The region where a compression stress is not formed is, in other words, the surface not subjected to the above chemical reinforcement.

Note that as an apparatus used for the cutting, a peripheral blade cutting apparatus, an internal blade cutting apparatus, a bandsaw, a wiresaw, a laser cutting apparatus, ascribe cleaving apparatus, or the like can be adopted.

As the shape of the plate end face, various shapes can be adopted depending upon the use and purpose of the plate glass. Examples of the shape of the plate end face include not only a flat face orthogonal to the plate surface, but also an inclined surface inclined with respect to the plate surface, a curved surface, an uneven surface, a polygonal surface, or a combined shape thereof.

Further, any outer appearance shape of the plate surface, any size thereof, and any plate thickness can be adopted as long as required strength performance is satisfied. For example, as the outer appearance shape of the plate surface, not only a rectangle, but also a circle, an oval, or a polygon such as a triangle, a pentagon, or a hexagon can be used. Further, in the case of a shape assuming an angular outer appearance, various shapes may be adopted for a corner portion of the plate surface. For example, a C-surface (corner-cutoff, also called corner cut), an R-surface, an inverse R-surface, hollowing-out, a notch, etc. may be used. The C-surface is a shape in which a corner is cut linearly. The R-surface is a shape in which a corner is cut as if it looks curved outside of the plate glass in a convex shape. The inverse R-surface is a shape in which a corner is cut as if it looks curved inside of the plate glass. The hollowing-out is a shape in which a corner is cut in a substantially U-shape or a semi-circular shape. The notch is a shape in which a corner is cut in a linear shape, i.e., an L-shape by a predetermined length on one side from the apex of the corner and by a predetermined length on the other side from the apex of the corner. Further, if required, fine chamfering may be performed. Regarding the size of the plate surface, the outside dimension of the order of mm to the order of m may be adopted. Regarding the plate thickness, various plate thicknesses of from 0.05 mm to 10 mm can be used. In the case where reinforcement needs to be performed or in the case of forming a thin plate glass to be mounted on a precision appliance, an electronic appliance, etc., the reductions in weight, thickness, length, and size are desired. Therefore, from this point of view, the plate thickness is preferably in a range of from 0.05 to 2 mm, more preferably in a range of from 0.06 mm to 1.5 mm, still more preferably in a range of from 0.07 mm to 1.4 mm, and further preferably in a range of from 0.08 to 0.6 mm.

Further, if the region where a compression stress is formed on the plate end face is distributed in parallel to the plate surface, in addition to the above, the reinforced plate glass of the present invention can realize desired strength of the plate surface and have highly stable mechanical strength.

As described above, on the plate end face, the region where a compression stress is formed is connected to the plate surface, and the region where a compression stress is not formed is connected to the region where a compression stress is formed. Therefore, on the plate end face, the region where a compression stress is not formed is sandwiched by the regions where a compression stress is formed from both the plate surface sides. With such a configuration, the reinforce plate glass can have stable performance in the strength of the plate end face, as well as the strength of the plate surface.

As a material for glass constituting the reinforced plate glass of the present invention, a glass material suitable for a chemical reinforcement method to be applied and an application can be selected appropriately from inorganic oxide glasses. For example, various kinds of inorganic glass materials such as borosilicate glass and aluminosilicate glass may be used. Further, if required, if a chemical reinforcement method to be applied is limited, crystallized glass, lead glass, or the like can be used. In the case where the reinforced plate glass is to be mounted on a precision appliance, an electronic appliance, etc., a glass material whose weather resistance decreases is not preferred. If a glass composition range is specifically limited, a general glass material, other than common soda-lime glass, whose $Al_2O_3$ content in a glass composition represented by an oxide conversion is less than 10% in a mass percentage is preferred. When the content of $Al_2O_3$ is 10% or more, even if a component that decreases the weather resistance, such as sodium and potassium, is contained, the effect of suppressing the decrease in weather resistance in the region where a compression stress is not formed on the plate end face becomes remarkably large.

The inventors of the present invention paid attention to the following: in the case where it is not necessary to reinforce a site which is not required to be reinforced chemically or in the case where a particular surface of a plate glass should not be subjected to chemical reinforcement due to the problems in terms of the production, the application, etc. caused by the chemical reinforcement, if a large plate glass can be cut after being ion-exchanged previously by adopting physical processing such as cutting, an unnecessary facility and the number of management items to be required for the chemical reinforcement are reduced to enhance the production efficiency remarkably, and the application range of the chemical reinforcement can be enlarged substantially. Then, the inventors of the present invention conducted various studies from the above point of view and found the following: in the case where particular reinforcement conditions are satisfied, a plate glass which is chemically reinforced previously can be processed satisfactorily even during cutting, is not damaged or broken when a tensile stress is applied to the glass, and further, after the cutting, the plate glass has sufficiently high strength performance. Such particular conditions are related to the stress state of the plate glass and can be realized by appropriately managing the mutual relationship between main values involving in some stress states.

More specifically, according to the reinforced plate glass of the present invention, in addition to the above, if the stress distribution in a plate thickness direction of a compression stress layer is limited in accordance with a compression stress function represented by a compression stress value of a plate surface, a thickness size of the compression stress layer, and the thickness size of the region where a compression stress is not formed, even in the case where an external force for physical processing is applied to the chemically reinforced plate glass, minute cracks and chipped portions which degrade remarkably the strength of glass are not generated on the physically processed surface of the plate glass, and thus, the processed reinforced plate glass has a processed surface of high quality.

Further, according to the reinforced plate glass of the present invention, in addition to the above, if the compression stress function is a function of dividing the product of a compression stress value and the thickness size of the compression stress layer by the thickness size of the region where a compression stress is not formed, and the value calculated by the function is 40 MPa or less, the surfaces opposed in the plate thickness direction of the reinforced plate glass are reinforced sufficiently. Further, even if a physical external force for forming an end face of a plate glass is applied to the plate glass, the plate glass is unlikely to be chipped or defects such as cracks are unlikely to be generated.

Herein, when the compression stress function is defined as F, the compression stress value is defined as P, the thickness size of the compression stress layer is defined as T, and the thickness size of the region where a compression stress is not formed is defined as L, they can be represented by the following Equation 1.

$$F = \frac{P \cdot T}{L} \leq 40 \ MPa \qquad \text{[Equation 1]}$$

In order to obtain the compression stress function F specifically, it is necessary to measure the compression stress value P, the thickness size of the compression stress layer T, and the thickness size of the region where a compression stress is not formed L, respectively. First, the compression stress value P and the thickness size of the compression stress layer T can be measured, for example, using a surface stress meter adopting a refractive index measuring method among a number of measuring methods of stress. Further, the thickness size of the region where a compression stress is not formed L can be calculated by Equation 2, because the thickness size of the opposed plate surfaces is the same when the thickness size of the compression stress layer T and the thickness size of the plate glass are sufficiently small. In Equation 2, X represents the plate thickness size of the plate glass. The plate thickness size X of the plate glass can be measured using a calibrated measurement appliance such as a microgauge or a laser measuring apparatus.

$$L = X - 2T \qquad \text{[Equation 2]}$$

More specifically, Equation 1 may be expressed as Equation 3 by substituting Equation 2 into Equation 1.

$$F = \frac{P \cdot T}{X - 2T} \leq 40 \ MPa \qquad \text{[Equation 3]}$$

Further, in the case where the plate thickness of a plate glass is large, or in the case where it is necessary to provide compression stress layers having different thickness sizes on the plate surfaces intentionally, Equation 4 may be adopted. In Equation 4, T1 and T2 represent thickness sizes of the compression stress layers with respect to the respective plate surfaces opposed to each other.

$$F = \frac{P \cdot T}{X - (T1 + T2)} \leq 40 \ MPa \qquad \text{[Equation 4]}$$

The compression stress function F of a reinforced plate glass can be calculated by a measured value before the plate glass is subjected to physical processing. In the case of actually producing a reinforced plate glass under predetermined conditions following the compression stress function F, reinforcement conditions to be conducted with respect to the plate glass are varied depending upon various facilities to be used for reinforcement. Therefore, it is necessary to set optimum production conditions such as temperature and time by previously setting the production conditions by the above-mentioned Equations 1 to 4. Further, in the case of performing a coating treatment using an organic resin, an inorganic material, and the like on the plate surface of the plate glass before the physical processing, it is necessary to make evaluations considering the influence caused by the coating treatment.

In the case where the compression stress function F is 40 MPa or less, the resulting tensile stress acting inside the plate glass does not exceed an allowable value. Therefore, unintended extending cracks are not generated during the physical processing, and hence, stable processing can be realized. When the compression stress function F exceeds 40 MPa, for example, in the case where the reinforced plate glass is subjected to cutting as the physical processing, unintended cracks are likely to be generated in a direction deviated from the cutting direction. When the tensile stress is too large, crack fractures move rapidly in the reinforced plate glass, and the plate glass may exhibit a state in which it is ruptured momentarily. Even in the case where the compression stress function F of the reinforced plate glass slightly exceeds 40 MPa, the occurrence frequency of unintended cracks may become large rapidly, decreasing the processing yield of the plate glass, which is not preferred.

Further, in addition to the above, if the compression stress of at least one surface of the opposed plate surfaces is in a range of from 200 to 1,500 MPa, the reinforced plate glass of the present invention can exhibit sufficient strength performance even in the case of the use for various kinds of information terminals.

When the compression stress value of the plate surface of the plate glass is 200 MPa or more, the plate glass exhibits sufficient mechanical strength, compared with unreinforced glass. On the other hand, when the compression stress value exceeds 1,500 MPa, the value of a tensile stress generated due to the compression stress generated on the plate surface becomes too large during the physical processing of the plate end face. As a result, the physical processing is unlikely to be performed smoothly. For example, when an attempt is made so as to perform cutting, minute cracks are generated in a direction different from the cutting direction. When the tensile stress is much larger, cracks extend rapidly in an unintended direction according to the tensile stress, and as a result, glass may be crushed. Further, as the thickness of the compression stress layer is larger, the tensile stress value increases, and similarly, the physical processing becomes difficult. For example, in the case of adopting a scribe cutting method as the cutting method of a plate glass, when the thickness of a compression stress layer exceeds 100 μm, cracks extending from the tip end of a scratch are not formed easily due to the compressive force during the formation of cut lines (scratches, scribe lines) with a predetermined depth in the cutting portion of the plate surface by a wheel chip, and troubles may be caused in the scribe processing. From the above point of view, the compression stress value of the plate surface of a plate glass is preferably 200 to 1,500 MPa, and the thickness of the compression stress layer is preferably 100 μm or less. Then, the compression stress value is more preferably in a range of from 500 to 1,100 MPa. The thickness size of the compression stress layer is more preferably 40 μm or less.

Further, in addition to the above, if an average breaking stress is measured to be 400 MPa or more by a four-point bending test according to JIS R1601 (1995), and a Weibull coefficient according to JIS R1625 (1996) is 3 or more, sufficiently highly stable strength can be realized, compared with an unreinforced plate glass.

Herein, the Weibull coefficient being 3 or more means the following: a glass test chip having a surface roughness of 0.20μ Ra or less according to JIS B0601 with a total length of 36 mm or more is produced in accordance with the Japanese Industrial Standards defined as "Bending Strength Test Method of Fine Ceramics" (JIS R1601) in 1995, and an indenter is lowered onto the test chip under a condition of a crosshead speed of 0.5 mm/min. to measure a four-point bending strength, whereby an average breaking stress value of an arithmetic average can be obtained; further, the measurement result of the strength is placed on a Weibull plot in accordance with the Japanese Industrial Standards defined as "Wiebull Statistical Analysis of Strength Data of Fine Ceramics" (JIS R1625) in 1996, and a Wiebull coefficient obtained from the gradient thereof is 3 or more. The Wiebull coefficient shows the stability of measurement results, and a larger Wiebull coefficient shows a more stable measurement result. It is not preferred that this value be less than 3, because the reliability on the strength performance of a reinforced plate glass is low.

In addition to the above, if the reinforced plate glass of the present invention contains 50 to 80% of $SiO_2$, 0 to 15% of $B_2O_3$, 3 to 25% of $Al_2O_3$, 0 to 20% of $Li_2O$, 0 to 20% of $Na_2O$, 3 to 25% of $Li_2O+Na_2O$, 0 to 20% of $K_2O$, 0 to 10% of $CaO+MgO+ZnO+SrO+BaO$, and 0 to 10% of $TiO_2+ZrO_2$, the reinforced plate glass can have high strength by selecting an appropriate chemical reinforcement such as a low-temperature ion exchange method.

The reason for limiting the content of each component constituting the reinforced plate glass of the present invention is described below.

A $SiO_2$ component forms the network of a glass structure in the atomic arrangement order, and is a main constituent of the glass structure. As the content of the $SiO_2$ component in a glass composition increases, the strength of the glass structure becomes high, and the chemical durability of the glass tends to increase. On the other hand, when the content of the $SiO_2$ component increases, the viscosity of molten glass in a high temperature region becomes too high, which makes it difficult to mold glass, and hence, there arises a constraint in the glass production such as the necessity to use an expensive facility. From the above point of view, when the content of the $SiO_2$ component is less than 50% bymass, the chemical durability of the molded plate glass becomes poor. On the other hand, it is not preferred that the content of the $SiO_2$ component exceeds 80% by mass, because various problems arise in terms of a facility, a production efficiency, and the like for melting glass homogeneously. Therefore, the content of the $SiO_2$ component is preferably in a range of from 50 to 80% by mass, more preferably in a range of from 60 to 80% by mass, and still more preferably in a range of from 60 to 70% by mass.

A $B_2O_3$ component is one of the components to be a network structure of a glass structure similarly to the $SiO_2$ component, and functions as a flux during melting of glass. However, when the content of the $B_2O_3$ component increases too much, the mobility of an alkali metal element component in solid glass decreases, for example, in the case of an ion exchange is conducted, with the result that the ion exchangeability may be decreased. Therefore, the content of the $B_2O_3$ component is preferably 15% by mass as an upper limit value, and more preferably at most 12% by mass.

An $Al_2O_3$ component facilitates the movement of an alkali metal element component in a glass structure, for example, in the case where an ion exchange is conducted, and also has a function of stabilizing the chemical durability of glass. Therefore, when the content of the $Al_2O_3$ component in glass is less than 3% by mass, there may be trouble for the chemical durability of glass, and the ion exchangeability may be decreased. On the other hand, when the content of the $Al_2O_3$ component in glass exceeds 25% by mass, the viscosity of molten glass during melting of glass becomes too high. Therefore, in order to obtain homogeneous plate glass, the upper limit of the content of the $Al_2O_3$ component is preferably set to be 25% by mass. As described above, the content of the $Al_2O_3$ component in glass is preferably in a range of from 3 to 25% by mass, and more preferably in a range of from 5 to 23% by mass. Further, in the case where the reinforced plate glass of the present invention is a thin plate glass to be mounted on a precision appliance, an electronic appliance, or the like, in order to obtain satisfactory weather resistance in a region where a compression stress of a plate end face is not formed, the content of the $Al_2O_3$ component is preferably in a range of from 10 to 25% by mass, more preferably in a range of from 10.1 to 23% by mass, still more preferably in a range of from 11 to 22.8% by mass, and most preferably in a range of from 12 to 22.8% by mass.

Both a $Li_2O$ component and a $Na_2O$ component have functions of decreasing the viscosity of molten glass and increasing the thermal expansion coefficient of glass. For example, in the case where ion exchange reinforcement is conducted, the ion exchange with $K^+$ ions with an ion radius larger than that of ions ($Na^+$ and $Li^+$) is conducted, whereby the density of a glass structure is increased and consequently, a compression stress acts. Therefore, the $Li_2O$ component and the $Na_2O$ component are indispensable for adopting such a reinforcement method. Thus, in order to exactly realize such functions in the glass structure, the total amount of the $Li_2O$ component and the $Na_2O$ component is preferably 3% by mass or more. However, it is not preferred that each amount of the $Li_2O$ component and the $Na_2O$ component be 20% by mass or more as a glass component because the thermal expansion coefficient of glass becomes too high, crystal is likely to be precipitated in molten glass, and defects are likely to be generated due to the devitrification of molten glass. It is also not preferred that the total amount of the $Li_2O$ component and the $Na_2O$ component be 25% by mass or more, because the chemical durability may be decreased. Thus, the total amount of the $Li_2O$ component and the $Na_2O$ component is preferably 3 to 25% by mass from the above point of view. Further, it is more preferred that each of the contents of the $Li_2O$ component and the $Na_2O$ component be from 0 to 15% by mass, and the total amount thereof is more preferably from 3 to 15% by mass.

A $K_2O$ component does not function so largely as the $Li_2O$ component and the $Na_2O$ component; however, the $K_2O$ component decreases the viscosity of molten glass in the same way as in the $Li_2O$ component and the $Na_2O$ component and increases the thermal expansion coefficient of glass. The $K_2O$ component may also suppress the devitrification caused by the $Li_2O$ component and the $Na_2O$ component. However, it is not preferred that the $K_2O$ component be contained in a glass composition in an amount of 20% by mass or more, because crystal caused by the $K_2O$ component is likely to be precipitated in molten glass, which may cause defects of glass due to devitrification. From this point of view, the $K_2O$ component is preferably in a range of from 0 to 20% by mass and more preferably in a range of from 0 to 10% by mass in a glass composition.

A CaO component, a MgO component, a ZnO component, a SrO component, and a BaO component each have a function of decreasing the viscosity of molten glass. When the total amount of these components exceeds 10% by mass, the chemical reinforcement may be interfered for the following reason. For example, in the case of ion exchange reinforcement, these components decrease the mobility of ions in glass. From the above point of view, the total amount of the CaO component, the MgO component, the ZnO component, the SrO component, and the BaO component is preferably at most 10% by mass and more preferably at most 8% by mass.

A $TiO_2$ component and a $ZrO_2$ component have a function of promoting the chemical reinforcement, and in addition, they improve the weather resistance of glass. When the $TiO_2$ component and the $ZrO_2$ component are contained in glass in a large amount, the function of enhancing the devitrification tendency of glass becomes remarkable. Therefore, the total amount of the $TiO_2$ component and the $ZrO_2$ component is more preferably 2% or more, and is preferably at most 10% by mass, more preferably at most 6% by mass, and most preferably at most 5% by mass.

In addition to the above, in the reinforced plate glass of the present invention, various kinds of components can be added to a glass composition, if required, in such a range as not to largely influence the performance including the strength performance, the chemical durability required in terms of an application, the viscosity during melting of glass, the devitrification resistance, and the like. Specific examples of the constituent components that can be used for the reinforced plate glass of the present invention include $P_2O_5$, $Fe_2O_3$, $SnO_2$, $Sb_2O_3$, $As_2O_3$, $SO_2$, $Cl_2$, $F_2$, PbO, $La_2O_3$, $WO_3$, $Nb_2O_5$, $Y_2O_3$, $MoO_3$, rare-earth oxides, and lanthanoide oxides, which may be contained in the glass composition as long as the content thereof is 3% or less in percent % by mass representation.

Further, in addition to the above, other components can be contained in the glass composition in an amount of up to 0.1% inpercent % bymass representation. Examples of the other components include various kinds of trace amount of components such as OH, $He_r$, $SO_3$, $CO_2$, CO, $H_2O$, He, Ne, Ar, and $N_2$.

Further, the reinforced plate glass of the present invention may contain a trace amount of noble metal elements as long as they do not largely influence the performance of the reinforced plate glass. For example, the reinforced plate glass may contain platinum elements such as Pt, Rh, and Os up to the order of ppm.

In addition to the above, if the physical processing is any of laser cutting and scribe cleaving, the production efficiency of the reinforced plate glass of the present invention can be enhanced; therefore, a reinforced plate glass of excellent quality can be supplied in a large amount to customers.

In addition to the above, the reinforced plate glass of the present invention may be provided with various kinds of functional coating films on the plate surface. Examples of the functional coating film include a thin film and a coating for ensuring the function as a protective film with respect to an external force applied to the surface of glass and optical performance, and a functional coat such as a conductive film required in a touch panel. Of those, an indium tin oxide (ITO) film, a reflection prevention film, and the like formed by sputtering can be used particularly.

A method of manufacturing a reinforced plate glass of the present invention comprises a compression reinforcement step of forming a compression stress layer on a surface of a plate glass by chemical reinforcement and a dividing step of applying a tensile stress to a plate surface of the plate glass chemically reinforced by the compression reinforcement step and dividing the plate glass, thereby obtaining the reinforced glass.

The compression reinforcement step is the step of enhancing the structure density of the plate surface of a plate glass and a bulk in the vicinity thereof. For example, in the case where ion exchange reinforcement is conducted, the compression reinforcement step represents the processing step of conducting various enforcements such as the step of soaking a plate glass in a heated molten salt to conduct ion exchange, the step of conducting a heat treatment while keeping a heat-resistant medium such as a ceramics non-woven fabric impregnated with a paste or a drug in contact with the plate glass, and the step of spraying a drug onto only one surface of the opposed plate surfaces of the plate glass and heating the plate glass while holding it horizontally with the sprayed surface directed upward.

Further, the dividing step is the step of dividing one reinforced plate glass into at least two plate glasses, and a specific operation to be conducted with respect to the reinforced plate glass for dividing is not limited. Examples of a cutting method of dividing the reinforced plate glass include a method of cutting by one operation such as a scribe break method and a method requiring at least two operations in which a scribe line is formed with a scribe or the like and thereafter, an bending operation is conducted. In addition, various kinds of methods such as a peripheral cutting method, an internal cutting method, a bandsaw method, a wiresaw method, a laser cutting method, a trimming method, and a blast processing method may be adopted appropriately.

Further, according to the method of manufacturing a reinforced plate glass of the present invention, more specifically, the compression reinforcement step includes a reinforcement condition setting step which is conducted for the purpose of previously determining the compression stress function F before the compression reinforcement and an appropriate stress applying step of conducting compression reinforcement under the condition of satisfying the appropriate compression stress function F.

The reinforcement condition setting step is conducted for the purpose of setting a processing temperature condition and a processing temperature time so as to set appropriate processing conditions, considering various factors such as the processing ability of an actual processing facility, human labor, or various conditions occurring during the process. In this step, a previously prepared glass sample chip is used, and whether or not the reinforcement conditions thereof satisfy the compression stress function F and a product to be obtained realizes sufficiently high strength are confirmed, whereby the reinforcement conditions are set. Then, chemical reinforcement is conducted during the appropriate stress applying step in accordance with the various conditions determined in the reinforcement condition setting step, whereby a plate glass having desired stable strength can be produced.

Further, according to the method of manufacturing a reinforced plate glass of the present invention, in addition to the above, it is preferred that the stress distribution in a plate thickness direction of the compression stress layer of the plate surface be limited during the compression reinforcement step in accordance with the compression stress function represented by the compression stress value of a plate surface, the thickness size of a compression stress layer, and the thickness size of a region where a compression stress is not formed, because the possibility that a plate glass is broken by the inside tensile stress present in the plate glass decreases, and hence, stable processing can be conducted, which enhances the production efficiency. Further, it is preferred that the compression stress function be a function obtained by dividing the product of a compression stress value and a thickness size of a compression stress layer by the thickness size of a region where a compression stress is not formed, and the value calculated by the function is 40 MPa or less.

Further, according to the method of manufacturing a reinforced plate glass of the present invention, in addition to the above, if the dividing step is conducted by any of laser cutting and scribe cleaving, the processing loss as a material for a plate glass can be reduced, and the processing techniques accumulated so far can be utilized, and hence, the dividing step can be conducted under stable conditions.

Further, according to the method of manufacturing a reinforced plate glass of the present invention, in addition to the above, the cutting in the dividing step may not include a breaking step.

Herein, "breaking" does not refer to cutting of a plate glass only by initial processing with a laser or a wheel chip, but refers to dividing of a plate glass by applying a stress so that a tensile stress can be concentrated on a scratch or a crack line formed in glass after the initial processing. According to such a processing method, the number of steps increases accordingly; however, in the present invention, such a breaking step is omitted to decrease the number of steps, whereby the problem of the contamination of glass due to glass powder generated during breaking and the problem of lacking or chipping occurring in a plate glass can be avoided.

Further, according to the method of manufacturing a reinforced plate glass of the present invention, in addition to the above, if the scribe cleaving is conducted under the condition of an application of from 0.5 to 1.5 kgf on the plate surface, appropriate cutting can be conducted without providing an overload on the reinforced plate glass, and hence, conditions preferable for various plate glass thicknesses can be adopted.

When the force application condition by a wheel chip or the like during scribe cleaving is smaller than 0.5 kgf, the function against a compressive force of the reinforced plate surface is not exhibited, and median cracks perpendicular to the plate surface do not extend into a glass bulk. On the other hand, it is not preferred that the force application condition by a wheel chip or the like during scribe cleaving exceed 1.5 kgf, because the overload conditions caused by such force application condition lead to a number of lateral cracks parallel to the reinforced plate glass and microcracks following the lateral cracks in addition to median cracks generated along with scribing, and the glass end face after cleaving does not become a clear surface state. From the above point of view, the force application condition with a wheel chip or the like during scribe cleaving is preferably from 0.8 to 1.1 kgf and more preferably from 1.0 to 1.1 kgf.

Further, according to the method of manufacturing a reinforced plate glass of the present invention, in addition to the above, if the scribe cleaving is conducted at a cleaving speed of from 10 to 1,000 mm/s, the reinforced plate glass can be produced at a high processing speed, and hence, reinforced plate glasses of excellent quality can be supplied to the market in a large amount.

Herein, the cleaving speed refers to a head speed of an indenter such as a wheel chip for scribing.

It is not preferred that the cleaving speed for scribe cleaving be lower than 10 mm/s, because the productivity is decreased, and in addition, median cracks generated by scribing do not proceed normally due to the tensile stress inside the reinforced plate glass. Further, when the cleaving speed for scribe cleaving is higher than 1,000 mm/s, the force applied from the wheel chip is not propagated sufficiently, and therefore, the growth of cracks is prevented by the compressive force of the reinforced plate glass surface, and median cracks extending in a direction perpendicular to the plate glass surface cannot extend to a sufficient depth. From the above point of view, the cleaving speed for scribe cleaving is more preferably from 10 to 500 mm/s, still more preferably from 10 to 300 mm/s, still more preferably from 10 to 100 mm/s, still more preferably from 20 to 80 mm/s, and most preferably from 40 to 80 mm/s.

Further, according to the method of manufacturing a reinforced plate glass of the present invention, in addition to the above, if the cutting edge angle of a wheel chip is in a range of from 90° to 150°, the transfer of the cutting edge of the wheel chip becomes smooth with respect to the reinforced plate surface.

In the case where the cutting edge angle of the wheel chip is less than 90°, the tip end of the wheel chip causes a strong stress only locally on the glass surface, and as a result, the insertion speed of the wheel chip into glass becomes higher than the propagation speed of median cracks extending in a direction perpendicular to the plate surface, and hence, a cut cross-section involved in the normal extension of cracks may not be formed. On the other hand, it is not preferred that the cutting edge angle of the wheel chip exceed 150°, because it becomes difficult to apply a sufficient tensile stress to the plate surface having a compression stress. From the above point of view, the cutting edge angle of the wheel chip is preferably in a range of from 100° to 145°, more preferably in a range of from 100° to 140°, and further preferably in a range of from 115° to 130°.

Further, according to the method of manufacturing a reinforced plate glass of the present invention, in addition to the above, it is preferred that the laser cutting can be conducted by laser light radiated from a carbon dioxide laser light source with an output of from 10 to 100 W, because unnecessary load will not be applied to the end face of the cut plate glass to cause minute cracks due to the appropriate range of the output conditions.

It is not preferred that the output range of a $CO_2$ laser be lower than 10 W, because median cracks with a sufficient depth cannot be formed on the plate surface, which may cause trouble to a cutting operation. On the other hand, it is not preferred that the output range of the $CO_2$ laser exceed 100 W, because the overload state causes the glass end face to be softened and deformed easily. From the above point of view, the output range of the $CO_2$ laser is preferably in a range of from 10 to 40 W.

Further, according to the method of manufacturing a reinforced plate glass of the present invention, in addition to the above, if the laser cutting can be conducted by operating radiation light at a transfer speed of from 5 to 100 mm/s with respect to the plate surface, plate glasses under various reinforcement conditions can be cut smoothly.

It is not preferred that the moving speed of laser light on the reinforced plate glass surface be lower than 5 mm/s, because the plate surface is overheated, and a softening phenomenon and the like of glass are recognized. On the other hand, when the moving speed of laser light on the plate surface exceeds 100 mm/s, damages sufficient for resisting a compression stress cannot be given to the reinforced plate surface, which makes the cutting difficult. From the above point of view, the moving speed of laser light on the plate surface is more preferably in a range of from 5 mm/s to 25 mm/s.

As described above, according to the present invention, a high production efficiency can be realized in the production of a reinforced plate glass, and a reinforced plate glass of high outer appearance quality can be provided, in which the strength of plate glass surfaces opposed to each other in a plate thickness direction can be increased, and surface defects such as chipping are not present on an end face.

DETAILED DESCRIPTION OF THE INVENTION

Hereinafter, a reinforced plate glass of the present invention and a method of manufacturing the reinforced plate glass are described by way of examples.

Example 1

Figure 1:
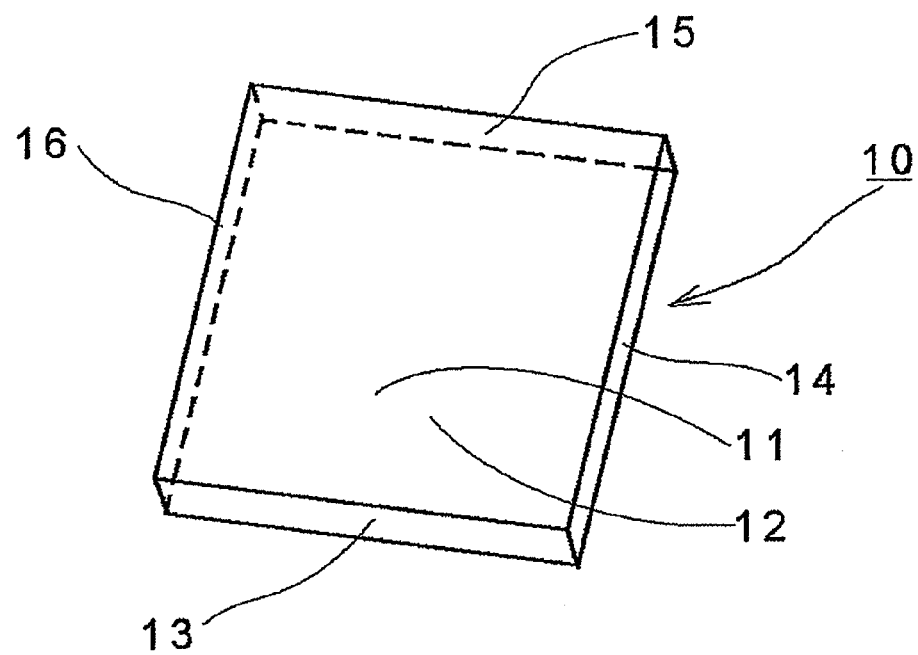
FIG. 1 is a perspective view of a reinforced plate glass of the present invention.

FIG. 1 is a perspective explanatory view of a reinforced plate glass of the present invention. The plate glass has a composition of 65.4% of $SiO_2$, 22.0% of $Al_2O_3$, 4.2% of $Li_2O$, 0.5% of $Na_2O$, 4.7% of $Li_2O+Na_2O$, 0.3% of $K_2O$, 1.5% of BaO, 2.0% of $TiO_2$, 2.2% of $ZrO_2$, 1.4% of $P_2O_5$, and 0.5% of $As_2O_3$ in percent % by mass of an oxide conversion.

A reinforced plate glass 10 is used for a transparent display panel to be mounted on a precision appliance, an electronic appliance, and the like such as a touch panel, a mobile telephone, and a mobile information terminal appliance. Therefore, it is necessary to reinforce only plate surfaces 11, 12 opposed to each other in a plate thickness direction, and further, a production efficiency needs to be enhanced. Therefore, the reinforced plate glass 10 is produced by soaking a parent plate glass having a large outer size of 500 mm (vertical size)×500 mm (horizontal size)×2 mm (plate thickness size) molded and ground by a roll-out method in a potassium nitrate molten salt with a temperature state managed as the compression reinforcement step, thereby conducting low-temperature ion exchange, washing off the potassium nitrate after the processing, followed by drying, and cleaving the glass at a cleaving speed of 50 mm/s under the application load condition of 1.05 kgf of a wheel chip, using a scribe apparatus having a ultra-steel wheel chip with a cutting edge angle of 125° as the dividing processing step.

In this example, corners of plate surfaces 11, 12 (borders between plate surfaces 11, 12 and plate end faces 13, 14, and 16) are not particularly processed, but if required, may be subjected to a C-surface cut or an R-surface cut.

In the reinforced plate glass 10, the plate surfaces 11, 12 are each reinforced when the reinforced plate glass 10 is soaked in a potassium nitrate bath and potassium ions in the bath diffuse to a glass bulk in the vicinity of the surface. On the other hand, the four plate end faces 13, 14, 15, and 16 of the reinforced plate glass 10 are processed surfaces formed by scribing, and hence, a part of the regions is not reinforced. More specifically, the plate end faces 13, 14, 15, and 16 include regions where a compression stress is formed and regions where a compression stress is not formed. Further, in the plate end faces 13, 14, 15, and 16, the regions where a compression stress is formed are each distributed in parallel with the plate surfaces 11 and 12. The scribing is performed under appropriate conditions, whereby the plate surfaces 11 and 12 can be cut smoothly even if they are reinforced. Further, in the reinforced plate glass 10, ion exchange is conducted in a condition so that processing can be performed without causing unintended defects such as cracks on the plate surfaces 11, 12, and the stress distribution in a plate thickness direction is optimum.

Under the ion exchange processing conditions of the reinforced plate glass 10, the conditions such as the processing index and the capacity of a potassium nitrate molten salt, and the temperature management method are considered as the reinforcement condition setting step, the processing conditions set by making evaluations for setting a processing condition temperature and a processing time, i.e., the appropriate processing conditions of 500° C. and 2 hours are set, and the parent plate glass molded and ground by the roll-out method as described above is reinforced in the appropriate stress applying step, using the setting conditions. In the setting of the processing conditions, the compression stress function F obtains a value of 20.0 MPa, defining the product of 870 MPa and 11 μm as a numerator and defining the value obtained by subtracting a value, which is obtained by multiplying 11 μm by 2, from 0.5 mm (i.e., 500 μm), and is previously set to be 40 MPa or less.

Figure 2:
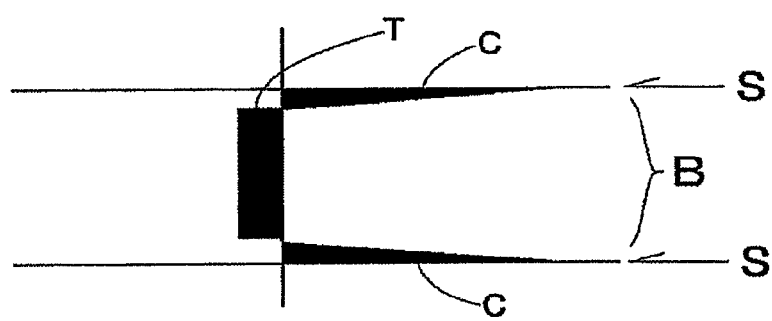
FIG. 2 is an explanatory view illustrating a reinforced state of the reinforced plate glass of the present invention.

FIG. 2 exemplifies a stress distribution formed by reinforcement, regarding plate surfaces S opposed to each other in a plate thickness direction. As is apparent from FIG. 2, an optimum compression stress C is formed on the plate surfaces S and in the vicinity thereof by reinforcement, and on the other hand, a tensile stress T acts in the vicinity of the center of a glass bulk B that is an inner region.

Figure 3:
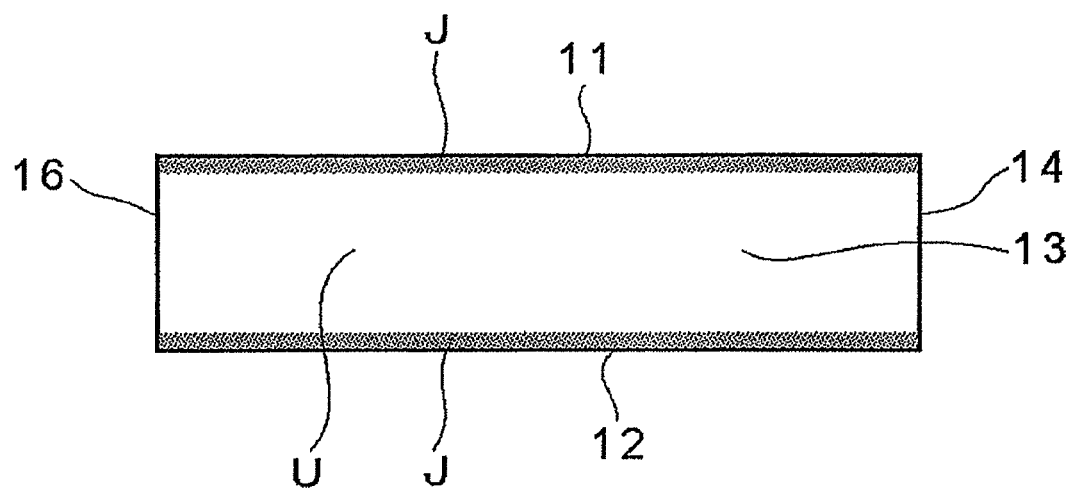
FIG. 3 is an explanatory view illustrating a stress distribution on the surface of an end face subjected to physical processing (scribing) of the reinforced plate glass of the present invention.

FIG. 3 shows a stress distribution of a plate end face of a plate glass formed by scribing. On the plate end face 13, compression stress regions J are formed so as to be in parallel with the borders between the plate surfaces 11, 12, opposed to each other in a plate thickness direction, and the plate end face 13, and a region U where a compression stress is not formed is present so as to be sandwiched by the compression stress regions J.

More specifically, the ion exchange conditions are as follows: in the case of producing the reinforced plate glass of the present invention, by previously setting the conditions matched with a facility for reinforcement, the compression stress distribution in a plate thickness direction is limited in accordance with a compression stress function F represented by a compression stress value P, a thickness size T of a compression stress layer, and a thickness size L of a region where a compression stress is not formed. More specifically, the compression stress function F is represented by the function obtained by dividing the product of the compression stress value P and the thickness size T of a compression stress layer by the thickness size L of a region where a compression stress is not formed, and the value calculated by the function is set to be 40 MPa or less.

Therefore, in order to obtain the compression stress value P of the plate surface of 870 MPa and the thickness size T of a compression stress layer of 11 μm, the temperature of potassium nitrate molten salt is previously managed to be 500° C. as an ion exchange condition and the time required for reinforcing a plate glass is set to be 2 hours in the reinforced plate glass 10. In the reinforced plate glass, the reinforced plate glass is not broken during the processing such as scribing, can be processed easily, and can be subjected to processing without the breaking step. Therefore, the problem of contamination of glass with glass powder generated during breaking and the lacking generated in the plate glass, i.e., the problem of chipping can be avoided.

Further, the plate end face of the reinforced plate glass 10 have no defects that remarkably decrease the glass strength such as microcracks and have a high strength.

Example 2

Next, the performance and the like of the reinforced plate glass of the present invention is described.

Table 1 shows collectively the reinforcement conditions for obtaining a glass composition and a reinforced plate glass corresponding to the example of the present invention, the conditions for processing glass, strength measurement results of glass, and the like, and the detail thereof is described specifically.

TABLE 1

| | | Example Sample No. | | | | | | | |
|---|---|---|---|---|---|---|---|---|---|
| | | 1 | 2 | 3 | 4 | 5 | 6 | 7 | 8 |
| | $SiO_2$ | 65.4 | 65.4 | 65.4 | 61.6 | 68.3 | 65.4 | 60.5 | 60.5 |
| | $B_2O_3$ | — | — | — | — | 10.9 | — | 1.8 | 1.8 |
| | $Al_2O_3$ | 22.0 | 22.0 | 22.0 | 13.2 | 5.2 | 22.0 | 12.0 | 12.0 |
| | $Li_2O$ | 4.2 | 4.2 | 4.2 | 1.9 | — | 4.2 | — | — |
| | $Na_2O$ | 0.5 | 0.5 | 0.5 | 8.0 | 11.3 | 0.5 | 13.8 | 13.8 |
| | $K_2O$ | 0.3 | 0.3 | 0.3 | 5.3 | — | 0.3 | 4.0 | 4.0 |
| | CaO | — | — | — | — | 3.2 | — | 1.7 | 1.7 |
| | ZnO | — | — | — | 7.4 | 0.9 | — | 2.0 | 2.0 |
| | BaO | 1.5 | 1.5 | 1.5 | — | — | 1.5 | — | — |
| | $TiO_2$ | 2.0 | 2.0 | 2.0 | 2.1 | — | 2.0 | — | — |
| | $ZrO_2$ | 2.2 | 2.2 | 2.2 | — | — | 2.2 | 4.0 | 4.0 |
| | $P_2O_5$ | 1.4 | 1.4 | 1.4 | — | — | 1.4 | — | — |
| | $As_2O_3$ | 0.5 | 0.5 | 0.5 | — | — | 0.5 | — | — |
| | $Sb_2O_3$ | — | — | — | 0.5 | 0.2 | — | 0.2 | 0.2 |
| | Plate thickness X (mm) | 0.5 | 0.5 | 0.5 | 0.5 | 0.5 | 0.5 | 0.7 | 0.5 |
| Reinforcement conditions | Processing temperature (° C.) | 500 | 475 | 475 | 400 | 490 | 500 | 410 | 410 |
| | Processing time (Hr) | 2 | 4 | 2 | 4 | 8 | 2 | 4 | 3 |
| Reinforcement results | Compression stress value P (Mpa) | 870 | 760 | 930 | 950 | 610 | 870 | 1,050 | 1,100 |
| | Thickness size T of compression stress layer (μm) | 11 | 13 | 9 | 9 | 16 | 11 | 23 | 15 |
| | Compression stress function F (Mpa) | 20.0 | 20.8 | 17.4 | 17.7 | 20.9 | 20.0 | 37.0 | 35.0 |

TABLE 1-continued

|  |  | Example Sample No. | | | | | | | |
|---|---|---|---|---|---|---|---|---|---|
|  |  | 1 | 2 | 3 | 4 | 5 | 6 | 7 | 8 |
| End face processing conditions | Processing method | Scribe | Scribe | Scribe | Scribe | Scribe | Laser | Scribe | Scribe |
|  | Application load (kgf) | 1.05 | 1.05 | 1.05 | 0.95 | 1 | — | 1.1 | 1.1 |
|  | Cutting edge angle (°) | 125 | 125 | 125 | 115 | 125 | — | 115 | 115 |
|  | Processing speed (mm/s) | 50 | 75 | 75 | 75 | 50 | — | 50 | 50 |
|  | Cutting property | Satisfactory | Satisfactory | Satisfactory | Satisfactory | Satisfactory | Satisfactory | Satisfactory | Satisfactory |
| Strength evaluations | Average breaking stress value (MPa) | 1,040 | 870 | 1,130 | 1,170 | 690 | 1,210 | 1,200 | 1,250 |
|  | Weibull coefficient | 5.4 | 6 | 5.1 | 5 | 6.5 | 7 | 7.5 | 7.8 |

In Table 1, Sample Nos. 1 to 8 were prepared as the reinforced plate glasses of the present invention, and in Table 1, the value of a glass composition represented by percent by mass of an oxide conversion, the plate thickness of a used plate glass, the conditions for chemical reinforcement, the reinforcement results, the value of a compression stress function F, the evaluation of strength, and the end face processing condition are shown in this order from the above.

Each glass sample in Table 1 is described regarding its use. Sample Nos. 1 to 5 are preferred as a thin plate glass with a relatively large area such as a touch panel, and Sample Nos. 1 to 4 and Nos. 6 to 8 are materials preferred particularly as a transparent display panel to be mounted on a precision appliance and an electronic appliance such as a mobile phone and a mobile information terminal appliance.

These samples were prepared using an actual production facility experimentally. Glass materials were blended and mixed previously so as to obtain each composition. The mixture was melted homogeneously in a glass melting furnace, molded by a roll-out method, and adjusted to a predetermined thickness by grinding, whereby a parent plate glass was obtained. Then, the parent plate glass thus produced was soaked in a molten salt tank in which a potassium nitrate molten salt was built up, changing the processing temperature condition and the processing time, whereby predetermined reinforcement was conducted.

Regarding the investigation of the reinforcement state of the plate glass thus reinforced, the compression stress value P and the thickness size T of a compression stress layer were both measured using a surface stress meter FSM-6000 manufactured by Orihara Manufacturing Co., Ltd.

The compression stress function F was calculated based on the evaluations of the compression stress value P and the thickness size T of a compression stress layer. As a result, the calculated values of Sample Nos. 1 to 8 were in a range of from 17.4 MPa to 37.0 MPa, all of which were 40 MPa or less. Thus, it was found that there was no problem.

Then, scribe cleaving was selected for those which were displayed as "SCRIBE" in Table 1 and laser cutting was selected for those which were displayed as "LASER" in Table 1, and the parent plate glass was processed in such a manner that a new glass surface was formed on a plate end face of a reinforced plate glass so as to have a size suitable for a strength test by any method.

Note that, regarding the scribe cleaving, the application load, cutting edge angle, and processing speed were evaluated, setting particular conditions, as shown in items of the end face processing conditions in Table 1, using a cleaving apparatus having an ultrahard wheel chip.

Further, regarding the laser cutting, cutting was conducted under the conditions of an output of 30 W and a transfer speed of 20 mm/s of laser light on a glass surface, using a cutting apparatus with a carbon dioxide gas laser as a light source.

Regarding the above-mentioned processing of a plate end face, as shown in items of the end face processing conditions, it was found that Sample Nos. 1 to 8 were in a state having satisfactory cutting property. Further, when the plate end face of the plate glass after cutting was observed with a microscope at a magnification of 100 times, remarkable cracks and lacks, i.e., chipping were not observed at all.

Further, regarding the evaluation of strength, a test chip with a width of 4 mm and a length of 40 mm was used, which was produced by processing a plate glass end face by the above-mentioned processing method, using an autograph testing machine manufactured by Shimadzu Corporation in accordance with "Bending test method of fine ceramics" JIS R1601 (1995). The strength test was conducted by a four-point bending test at a pressure jig width of 10 mm, a support jig width of 30 mm, and a crosshead speed of 0.5 mm/min under the conditions that a pressure jig was in contact with a scribe cleaving surface or a laser cutting surface of the sample. The arithmetic average of the obtained results was calculated to obtain an average breaking stress value. Further, a Weibull coefficient was obtained from a gradient of a Weibull plot in accordance with "Weibull statistical analysis method of strength data of fine ceramics" JIS R1625 (1996).

As a result of the above strength evaluations, in Sample Nos. 1 to 8 that are examples, the average breaking stress value was in a range of from 690 MPa to 1,250 MPa, all of which were 400 MPa or more. Further, the Weibull coefficient was from 5.0 to 7.8, and it was found that the Weibull coefficient was 3 or more.

Sample Nos. 7 and 8 having the typical and best glass composition of the present invention is described further.

The glass compositions of Sample Nos. 7 and 8 have a composition of 60.5% of $SiO_2$, 1.8% of $B_2O_3$, 12.0% of $Al_2O_3$, 13.8% of $Na_2O$, 4.0% of $K_{2O}$, 1.7% of CaO, 2.0% of ZnO, 4.0% of $ZrO_2$, and 0.2% of $Sb_2O_3$, represented by percent by mass of an oxide conversion, and the content of an $Al_2O_3$ component was 10% or more. Therefore, Sample Nos. 7 and 8 have a glass composition of the reinforced plate glass of the present invention exhibiting high performance even in suppressing the decrease in weather resistance in a region of a plate end face where a compression stress is not formed.

These plate glasses were subjected to scribing under the same conditions except that Sample No. 7 had a plate thickness of 0.7 mm and Sample No. 8 had a plate thickness of 0.5 mm. The compression stress function F of Sample No. 7 was 37.0 MPa and that of Sample No. 8 was 35.0 MPa, both of which satisfied the requirement of 40 MPa or less of the present invention. Therefore, a sharp and refined processed surface along a planned line of scribe was obtained by scribing, and surface defects such as lacks and cracks were not recognized. Thus, processing of high quality was performed.

Further, the average breaking stress values of Sample Nos. 7 and 8 were 1,200 MPa and 1,250 MPa, respectively, which were sufficiently high, and exhibited a high Weibull coefficient of 7.5 and 7.8. Thus, the most preferred result was obtained in the present invention.

Accordingly, it was found that each of Sample Nos. 1 to 8 has sufficient performance as the reinforced plate glass of the present invention and has high strength.

Comparative Examples

Then, Sample Nos. 101 to 105 shown in Table 2 as the comparative examples of the present invention are described below.

No. 101 was not reinforced after scribe cutting, and Sample No. 102 was reinforced after scribe cutting.

As a result of the evaluation of the comparative examples, Sample No. 101 had the same composition as that of Sample No. 1 of the example. However, Sample No. 101 had a low Weibull coefficient, i.e., 2.6, although having an average breaking stress value of 330 MPa. Thus, Sample No. 101 did not satisfy the requirements of the present invention.

Sample No. 102 had an average breaking stress value of 800 MPa and a Weibull coefficient of 4.5. The average breaking stress value and the Weibull coefficient of Sample No. 102 were both inferior to those of Example 1, in spite of the fact that Sample No. 102 had the same composition as that of Example 1. The detailed reasons for such results are not known. The inventors of the present invention predicted as follows: unlike the present invention, the above test chip is reinforced after processing, that is, the test chip has a stress distribution state that does not satisfy the requirements of the present invention, and hence, defects on a glass surface, such as chipping caused during processing or reinforcement, have an influence on the results. Further, the production fee is expensive under the production conditions of Sample No. 102, which clearly decreases production efficiency.

TABLE 2

|  |  | Comparative Example Sample No. | | | | |
|---|---|---|---|---|---|---|
|  |  | 101 | 102 | 103 | 104 | 105 |
|  | $SiO_2$ | 65.4 | 65.4 | 65.4 | 68.3 | 65.4 |
|  | $B_2O_3$ | — | — | — | 10.9 | — |
|  | $Al_2O_3$ | 22.0 | 22.0 | 22.0 | 5.2 | 22.0 |
|  | $Li_2O$ | 4.2 | 4.2 | 4.2 | — | 4.2 |
|  | $Na_2O$ | 0.5 | 0.5 | 0.5 | 11.3 | 0.5 |
|  | $K_2O$ | 0.3 | 0.3 | 0.3 | — | 0.3 |
|  | CaO | — | — | — | 3.2 | — |
|  | ZnO | — | — | — | 0.9 | — |
|  | BaO | 1.5 | 1.5 | 1.5 | — | 1.5 |
|  | $TiO_2$ | 2.0 | 2.0 | 2.0 | — | 2.0 |
|  | $ZrO_2$ | 2.2 | 2.2 | 2.2 | — | 2.2 |
|  | $P_2O_5$ | 1.4 | 1.4 | 1.4 | — | 1.4 |
|  | $As_2O_3$ | 0.5 | 0.5 | 0.5 | — | 0.5 |
|  | $Sb_2O_3$ | — | — | — | 0.2 | — |
|  | Plate thickness X (mm) | 0.5 | 0.5 | 0.5 | 0.4 | 0.5 |
| Reinforcement conditions | Processing temperature (° C.) | — | 500 | 500 | 520 | 500 |
|  | Processing time (Hr) | — | 2 | 24 | 24 | 24 |
| Reinforcement results | Compression stress value P (Mpa) | — | 870 | 690 | 404 | 690 |
|  | Thickness size T of compression stress layer (μm) | — | 11 | 36 | 39 | 36 |
| Compression stress function F (Mpa) |  | — | 20.0 | 57.0 | 49.0 | 57.0 |
| End face processing conditions | Processing method | — | — | Scribe | Scribe | Laser |
|  | Application load (kgf) | — | — | 1.05 | 1.1 | — |
|  | Cutting edge angle (°) | — | — | 125 | 115 | — |
|  | Processing speed (mm/s) | — | — | 50 | 50 | — |
|  | Cutting property | — | — | Impossible | Impossible | Impossible |
| Strength evaluations | Average breaking stress value (MPa) | 330 | 800 | — | — | — |
|  | Weibull coefficient | 2.6 | 4.5 | — | — | — |

Regarding the comparative examples, each sample was prepared in the same procedure as that of the examples. Sample No. 101 was prepared as a sample which was not reinforced. Further, Sample Nos. 101 and 102 were produced by scribe cutting, and the scribing conditions follow the conditions in the case of cutting a reinforced plate glass. Sample Sample No. 103 had the same composition as that of Sample No. 1, and the evaluation of a cutting property was conducted by scribe cutting under the same condition as that of Sample No. 1 that was the example after ion exchange reinforcement under the conditions of 500° C. and 24 hours as shown in Table 2. The compression stress function F was a high value, i.e., 57.0 MPa which was more than 40 MPa. As a result, when an attempt was made so as to conduct scribing, cracks were propagated to a portion other than a portion to be cut, and a plate glass was partially broken, and hence, Sample No. 103 had a quality insufficient for obtaining good quality goods.

Sample No. 104 had the same composition as that of Sample No. 5, and the evaluation of a cutting property was conducted by scribe cutting under the same condition as that of Sample No. 1 that was the example after ion exchange reinforcement under the conditions of 410° C. and 24 hours as shown in Table 2. Regarding Sample No. 104, the compression stress function F was 49.0 MPa which was also more than 40 MPa. Therefore, a number of lacking defects and the like occurred during scribing, and in some cases, Sample No. 104 had a quality in which the same breakage of a plate glass as that of Sample No. 103 was recognized. Further, Sample No. 104 contained an $Al_2O_3$ component in an amount of less than 10%. Therefore, when an environment evaluation or the like of glass was conducted in a thermo-hygrostat tank, trouble was caused to the weather resistance in a region of a plate end face where a compression stress was not formed, and a precipitate was likely to be generated on the surface.

Sample No. 105 had the same composition as that of Sample No. 1, and the evaluation of a cutting property was conducted by laser cutting under the same condition as that of the example after ion exchange reinforcement under the conditions of 500° C. and 24 hours as shown in Table 2. The plate glass was broken in the same way as in scribing, and thus, Sample No. 105 had a quality that desired processing could not be conducted.

Sample Nos. 103 to 105 were each produced under the condition that the compression stress function was more than 40 MPa. Therefore, in each of Sample Nos. 103 to 105, a satisfactory cutting property was not obtained, the ratio of good quality was decreased, and an economically excellent reinforced plate glass was not obtained.

As described above, it was found from the examples and the comparative examples that the reinforced plate glass of the present invention can realize a production efficiency with a high economical efficiency, and has sufficiently excellent strength.

Example 3

Figure 4:
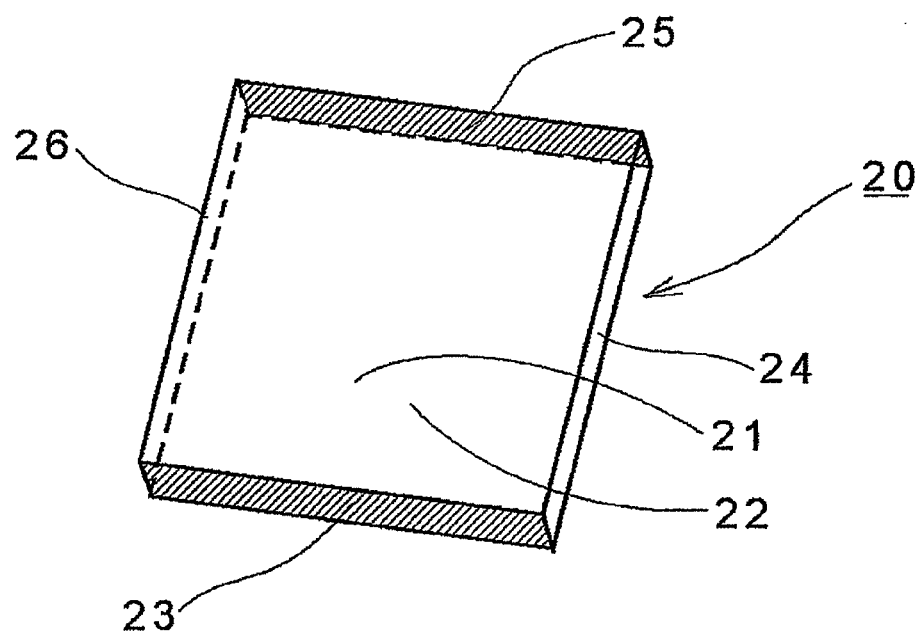
FIG. 4 is a perspective view of another reinforced plate glass of the present invention.

Further, FIG. 4 is a perspective explanatory view illustrating a reinforced plate glass as an example of the present invention in a different aspect from that of Example 1.

The reinforced plate glass 20 shown in FIG. 4 is different from the previous Example 1 in that ion exchange reinforcement is conducted during the processing of a reinforced plate glass. More specifically, a plate glass that is preliminarily formed into a strap shape is subjected to an ion exchange treatment, and only two plate end faces of the strap-shaped plate glass are cut by physical processing. Thus, in FIG. 4, among the plate end faces 23, 24, 25, and 26 of the reinforced plate glass, the plate end faces 23 and 25 are not subjected to ion exchange reinforcement, and the other plate end faces 24 and 26 are subjected to ion exchange reinforcement. In this respect, in the case of the previous Example 1, none of the plate end faces 13, 14, 15, and 16 are subjected to ion exchange reinforcement. It is possible to arbitrarily determine an end face which is to be subjected to ion exchange in terms of the use, production efficiency, and the like.

The invention claimed is:

1. A method of manufacturing a reinforced plate glass, the method comprising the steps of:
   making a plate glass made of an aluminosilicate glass comprising 50 to 80% of $SiO_2$, 12 to 25% of $Al_2O_3$, 3 to 25% of $Li_2O+Na_2O$, and 0 to 10% of $CaO+MgO+ZnO+SrO+BaO$, represented by percent by mass of an oxide conversion;
   forming a compression stress layer on each plate surface of the plate glass by chemical reinforcement, the compression stress layers having a thickness of 23 to 100 μm and a compression stress value of 610 to 1500 MPa; and
   dividing, after the forming of the compression stress layers, the plate glass chemically reinforced by scribe cutting, the scribe cutting comprising the steps of forming a scribe line on a plate surface and applying a tensile stress to the scribe line to divide the plate glass, to obtain the reinforced plate glass which comprises a plate end face comprising a region where a compression stress is formed and a region where a compression stress is not formed,
   wherein a stress distribution in a plate thickness direction of one of the compression stress layers of the plate surfaces is limited in accordance with a compression stress function represented by a compression stress value of the respective plate surface, the thickness of the one of the compression stress layers, and a thickness region where the compression stress is not formed and
   wherein the compression stress function for the one of the compression stress layers is obtained by dividing a product of the compressive stress value of the respective plate surface and the thickness of the one of the compression stress layers by the thickness of the region where the compression stress is not formed, and a value calculated by the compression stress function is 40 MPa or less.

2. The method of manufacturing a reinforced plate glass according to claim 1, wherein the aluminosilicate glass comprises 0 to 1.9 mass % of $Li_2O$.

3. The method of manufacturing a reinforced plate glass according to claim 1, wherein the tensile stress applied during the scribe cutting is set from 0.5 to 1.5 kgf.

4. The method of manufacturing a reinforced plate glass according to claim 1, wherein the scribe cutting is conducted at a scribing speed of from 10 to 1,000 mm/s.

5. The method of manufacturing a reinforced plate glass according to claim 1, wherein the indenter is a wheel chip having a cutting edge angle of 90° to 140°.

* * * * *